US011027391B2

(12) United States Patent
Ishii et al.

(10) Patent No.: US 11,027,391 B2
(45) Date of Patent: Jun. 8, 2021

(54) WORKPIECE MEASUREMENT METHOD

(71) Applicant: MAKING MILLING MACHINE CO., LTD., Tokyo (JP)

(72) Inventors: Kazunari Ishii, Aiko-gun (JP); Koji Kasai, Aiko-gun (JP); Alexandra Florentina Stancu, Aiko-gun (JP)

(73) Assignee: MAKING MILLING MACHINE CO., LTD., Tokyo (JP)

( * ) Notice: Subject to any disclaimer, the term of this patent is extended or adjusted under 35 U.S.C. 154(b) by 278 days.

(21) Appl. No.: 16/331,751

(22) PCT Filed: Sep. 9, 2016

(86) PCT No.: PCT/JP2016/076700
§ 371 (c)(1),
(2) Date: Mar. 8, 2019

(87) PCT Pub. No.: WO2018/047312
PCT Pub. Date: Mar. 15, 2018

(65) Prior Publication Data
US 2019/0247970 A1    Aug. 15, 2019

(51) Int. Cl.
*G01B 5/008* (2006.01)
*B23Q 17/22* (2006.01)
*B23Q 17/20* (2006.01)

(52) U.S. Cl.
CPC ............. *B23Q 17/22* (2013.01); *B23Q 17/20* (2013.01); *G01B 5/008* (2013.01); *B23Q 2705/02* (2013.01); *B23Q 2717/00* (2013.01)

(58) Field of Classification Search
CPC ......... B23Q 17/22; B23Q 17/20; G01B 5/008
(Continued)

(56) References Cited

U.S. PATENT DOCUMENTS 4,631,834 A * 12/1986 Hayashi ................ G01B 5/008
33/1 M
2011/0283847 A1  11/2011 Schreiber
(Continued)

FOREIGN PATENT DOCUMENTS

EP  1962160 A2  8/2008
JP  1-301042     5/1989
(Continued)

OTHER PUBLICATIONS

International Search Report dated Dec. 6, 2016, directed to International Application No. PCT/JP2016/076700; 2 pages.

*Primary Examiner* — George B Bennett
(74) *Attorney, Agent, or Firm* — Morrison & Foerster LLP

(57) ABSTRACT

Disclosed is a workpiece measurement method for determining the position of a workpiece on a machine tool based on feed shaft coordinates when a probe and the workpiece contact each other, in which the probe and the workpiece are moved relative to each other. The method includes the steps of moving one of the plurality of feed shafts to a desired measurement position, storing coordinate values of the one feed shaft at the desired measurement position, moving the probe and the workpiece relative to each other by means of the one feed shaft and another feed shaft, stopping the movement by the one feed shaft when the stored coordinate values have been reached, and measuring the workpiece at a plurality of measurement points by moving the probe using the other feed shaft in a state in which the one feed shaft is stopped at the coordinate values.

4 Claims, 10 Drawing Sheets

(58) Field of Classification Search
USPC .......................................................... 33/503
See application file for complete search history.

(56) References Cited

U.S. PATENT DOCUMENTS

| 2014/0298668 | A1* | 10/2014 | Huang | G01B 21/24 |
| | | | | 33/645 |
| 2019/0025793 | A1* | 1/2019 | Ould | B23Q 17/22 |
| 2020/0378738 | A1* | 12/2020 | Kanbe | G01B 21/045 |
| 2021/0010791 | A1* | 1/2021 | Puntigam | G01B 5/008 |
| 2021/0033377 | A1* | 2/2021 | Ishii | G01B 5/202 |

FOREIGN PATENT DOCUMENTS

| JP | 2000-198047 | 7/2000 |
| JP | 2008-111770 | 5/2008 |
| JP | 2016-018255 | 2/2016 |

* cited by examiner

WORKPIECE MEASUREMENT METHOD

CROSS-REFERENCE TO RELATED APPLICATIONS

This application is a U.S. national phase patent application of International Patent Application No. PCT/JP2016/076700, filed Sep. 9, 2016, which is hereby incorporated by reference in the present disclosure in its entirety.

FIELD OF THE INVENTION

The present invention relates to a workpiece measurement method in which a workpiece fixed to a table of a machine tool can be measured by a simple operation.

BACKGROUND OF THE INVENTION

In machine tools, prior to executing a machining program to machine a workpiece, the workpiece is measured in order to set reference positions of the workpiece in a machine tool, and the dimensions of the machined workpiece on the machine are measured. In such a case, a measurement probe is mounted on the tip of the spindle, and the workpiece is measured using a feed shaft device of the machine tool. PTL 1 and 2 describe such methods for measuring workpieces on a machine.

In the NC device of PTL 1, the feed shaft device is manually operated to contact a touch probe mounted on the spindle with an end surface of the workpiece, the position of the end surface is set as an origin as a centering position, the feed shaft device is manually operated to measure the inner surface of a cylindrical recess or the outer surface of a cylindrical protrusion on the workpiece at three locations, or two opposite end surfaces with the touch probe, the center position of the recess or the protrusion is calculated, or alternatively the midpoint position of the two end surfaces is calculated, and the calculated center position or midpoint position is set as the origin as a centering position.

In the machine tool of PTL 2, the feed shaft device is manually operated, a probe of the measurement head is contacted with the workpiece, machine coordinates at the time of contact of the probe are acquired from a skip signal transmitted from the measurement head at that time and current position data read by feed shaft position reading means, and the machine coordinates are displayed on the screen of a display part.

PATENT LITERATURE

[PTL 1] Japanese Unexamined Patent Publication (Kokai) No. 01-301042

[PTL 2] Japanese Unexamined Patent Publication (Kokai) No. 2008-111770

BRIEF SUMMARY OF THE INVENTION

As described in PTL 1 and 2, in the case in which the feed shaft is manually operated to contact the measurement probe mounted on the spindle with a plurality of measurement points on the side surfaces of the workpiece, when the measurement probe is moved from a measurement point to another measurement point, the height in the Z-axis direction may be different for each measurement point. In workpieces in which the side surfaces of the workpiece to be measured are shaped so as to be parallel to the Z-axis, even if the actual heights of the measurement points are different, the workpiece can be measured accurately in the X-axis and Y-axis directions. However, in workpieces in which the side surfaces of the workpiece to be measured are not shaped so as to be parallel to the Z-axis, it is necessary to maintain a constant measurement point height. Furthermore, when straightness errors of the Z-axis feed shaft are taken into consideration, the influence of straightness errors of the Z-axis feed shaft can be prevented in measurements using the same Z-axis coordinates, whereby measurement precision improves. However, it is very difficult and time consuming to stop the position of the Z-axis accurately by manual operation with a jog dial or handle. Additionally, it is necessary to confirm that the feed shaft has reached such a position using coordinate values.

The object of the present invention is to solve such problems of the prior art by providing a measurement method with which an operator can quickly, easily, and accurately perform measurement of a workpiece.

In order to achieve the above object, according to the present invention, there is provided a workpiece measurement method for determining the position of a workpiece on a machine tool based on feed shaft coordinates when a probe and the workpiece contact each other, in which the probe and the workpiece are moved relative to each other by a plurality of feed shafts, the method comprising the steps of moving one of the plurality of feed shafts to a desired measurement position, storing coordinate values of the one feed shaft at the desired measurement position, moving the probe and the workpiece relative to each other by means of the one feed shaft and another feed shaft, stopping the movement by the one feed shaft when the stored coordinate values have been reached, and measuring the workpiece at a plurality of measurement points by moving the probe using the other feed shaft in a state in which the one feed shaft is stopped at the coordinate values.

According to the present invention, during setup prior to the execution of a machining program for machining a workpiece, or alternatively, after machining, when an operator measures a workpiece on a machine, the probe can quickly, easily and accurately be stopped at the same position relative to the workpiece with a feed shaft, whereby the time necessary for measure is reduced and the reliability of measurement results is improved.

DETAILED DESCRIPTION OF THE INVENTION

Preferred embodiments of the present invention will be described below with reference to the attached drawings.

Figure 1:
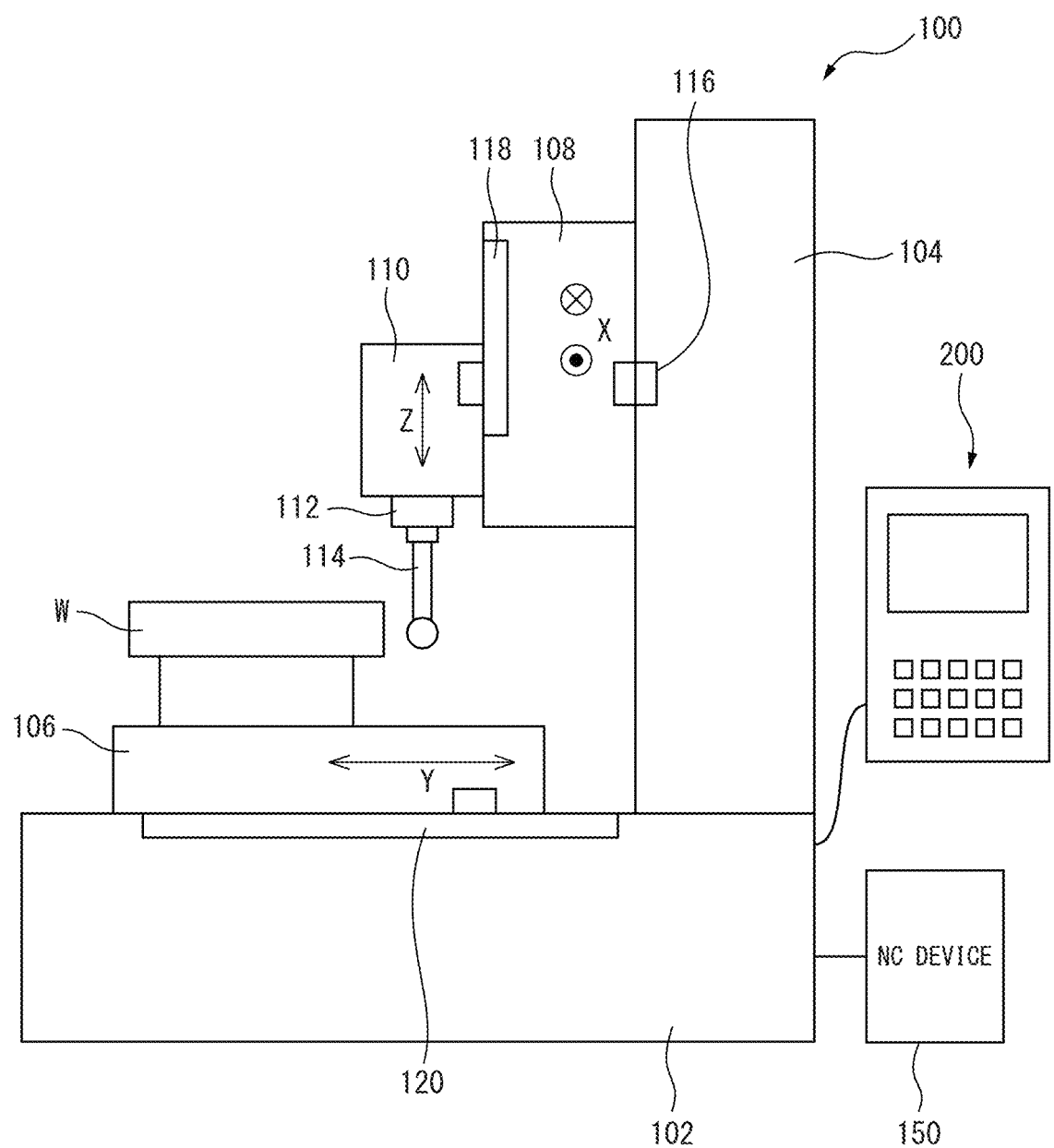
FIG. 1 is a side view showing an example of a machine tool to which the present invention is applied.

FIG. 1 shows an example of the machine tool to which the present invention is applied. In FIG. 1, the machine tool 100 according to the preferred embodiment of the present invention is configured as a vertical machining center, and comprises a bed 102 as a pedestal, which is fixed to the floor surface of a factory, a table 106 which is provided on the upper surface of a front portion (left side in FIG. 1) of the bed 102 so as to be movable in the forward and backward directions or the Y-axis directions (the lateral directions in FIG. 1) and on which a workpiece W is fixed, an upright column 104 which is fixed on the upper surface of the bed 102 on the rear end side (the right side in FIG. 1) of the bed 102, an X-axis slider 108 provided on the front surface of the column 104 so as to be movable in the left and right directions or the X-axis directions (the directions perpendicular to the sheet of the drawing of FIG. 1), and a spindle head 110 which rotatably supports a spindle 112 and which is mounted on the front surface of the X-axis slider 108 so as to be movable in the upward and downward directions or the Z-axis directions. The machine tool 100 further comprises an operation panel 200 with which an operator can operate the machine tool 100.

A tool (not illustrated) for machining the workpiece W, which is fixed on the table 106, is mounted on the tip of the spindle 112. In FIG. 1, in place of a tool, a measurement probe 114 as a probe for measuring the workpiece W, is mounted on the tip of the spindle 112. The measurement probe 114 can be manually mounted by the operator of the machine tool 100 or can be automatically mounted by an NC device 150 of the machine tool 100.

The table 106 is provided so as to be reciprocatable along a pair of Y-axis guide rails (not illustrated) extending parallel to the Y-axis directions (the left and right directions of FIG. 1) on the upper surface of the bed 102. A ball screw (not illustrated) extending in the Y-axis direction as a Y-axis feed device for reciprocating the table 106 along the Y-axis guide rails, and a Y-axis servo motor (not illustrated) connected to one end of the ball screw are provided on the bed 102. A nut (not illustrated) for engagement with the ball screw is attached to the table 106. A Y-axis scale 120 for measuring the coordinate position of the table 106 in the Y-axis directions is attached to the table 106.

The X-axis slider 108 is provided so as to be reciprocatable along a pair of X-axis guide rails (not illustrated) extending in the X-axis directions on the front surface of an upper portion of the column 104. A ball screw (not illustrated) extending in the X-axis directions as an X-axis feed device for reciprocating the X-axis slider 108 along the X-axis guide rails, and an X-axis servomotor (not illustrated) connected to one end of the ball screw are provided on the column 104. A nut (not illustrated) for engagement with the ball screw is attached to the X-axis slider 108. An X-axis scale 116 for measuring the coordinate position of the X-axis slider in the X-axis directions is attached to the column 104.

The spindle head 110 is provided so as to be reciprocatable along a pair of Z-axis guide rails extending in the Z-axis directions (the upward and downward directions in FIG. 1) on the front surface of the X-axis slider 108. A ball screw (not illustrated) extending in the Z-axis direction as a Z-axis feed device for reciprocating the spindle head 110 along the Z-axis guide rails and a Z-axis servomotor (not illustrated) connected to one end of the ball screw are provided on the X-axis slider. A nut (not illustrated) for engagement with the ball screw is attached to the spindle head 110. A Z-axis scale 118 for measuring the coordinate position of the spindle head 110 in the Z-axis directions is attached to the X-axis slider.

The X-axis servomotor, Y-axis servomotor, and Z-axis servomotor, as well as the X-axis scale 116, Y-axis scale 118, and Z-axis scale 120 are connected to the NC device 150 (FIG. 4) for controlling the machine tool 100. The measurement probe 114 transmits a signal to the NC device 150 upon contact with the workpiece. The power (current value) supplied to the X-axis servomotor, Y-axis servomotor, and Z-axis servomotor is controlled by the NC device 150.

Figure 2:
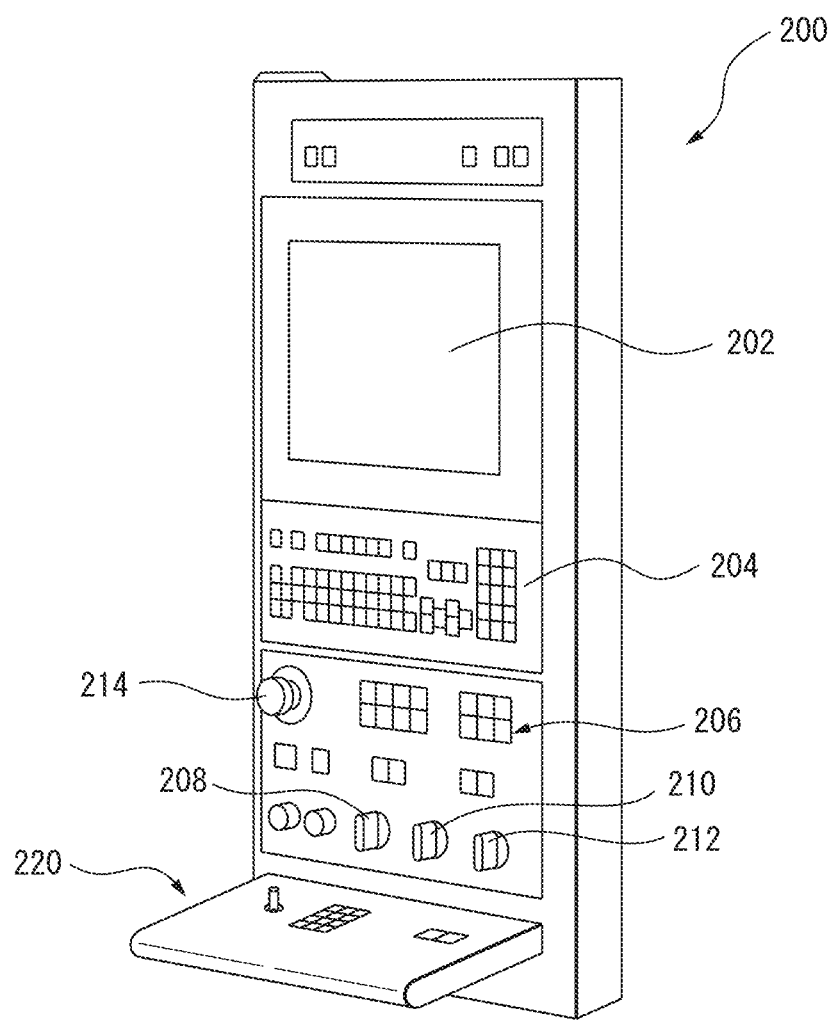
FIG. 2 is a perspective view of a control panel.
Figure 3:
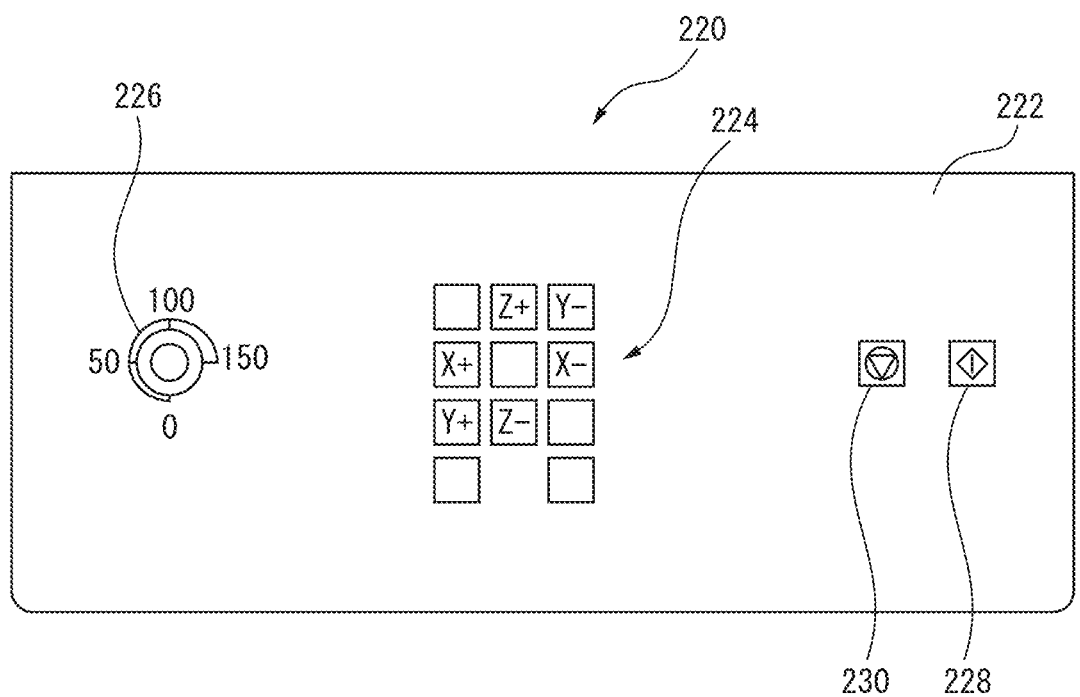
FIG. 3 is a plan view of a jog console.

The operation panel 200 will be explained with reference to FIGS. 2 and 3. The operation panel 200 includes a display panel 202, such as a touch panel, with which a desired portion can be selected by touching the screen, and a key input part 204. A plurality of key switches are located on the key input part 204. Predetermined numbers and letters can be input by pressing the key switches of the key input part 204. Furthermore, the operation panel 200 includes an operation switch part 206 for performing selection of predetermined operations, override setting parts 208 to 212 for performing the setting of override values, and an emergency stop button 214. The override setting parts 208 to 212 can be used to set, for example, a spindle rotation speed override value or a machining feed speed override value.

The operation panel 200 further comprises a jog console 220 including a board 222 extending in a shelf-like manner frontwards from the lower end portion of the operation panel 200. Jog buttons 224 for individually jog-feeding each of the X-axis, Y-axis, and Z-axis feed shafts, an override switch 226 for setting the jog-feeding speed, an automatic measurement start button 228, and a measurement stop button 230 are arranged on the board 222 of the jog console 220.

Figure 4:
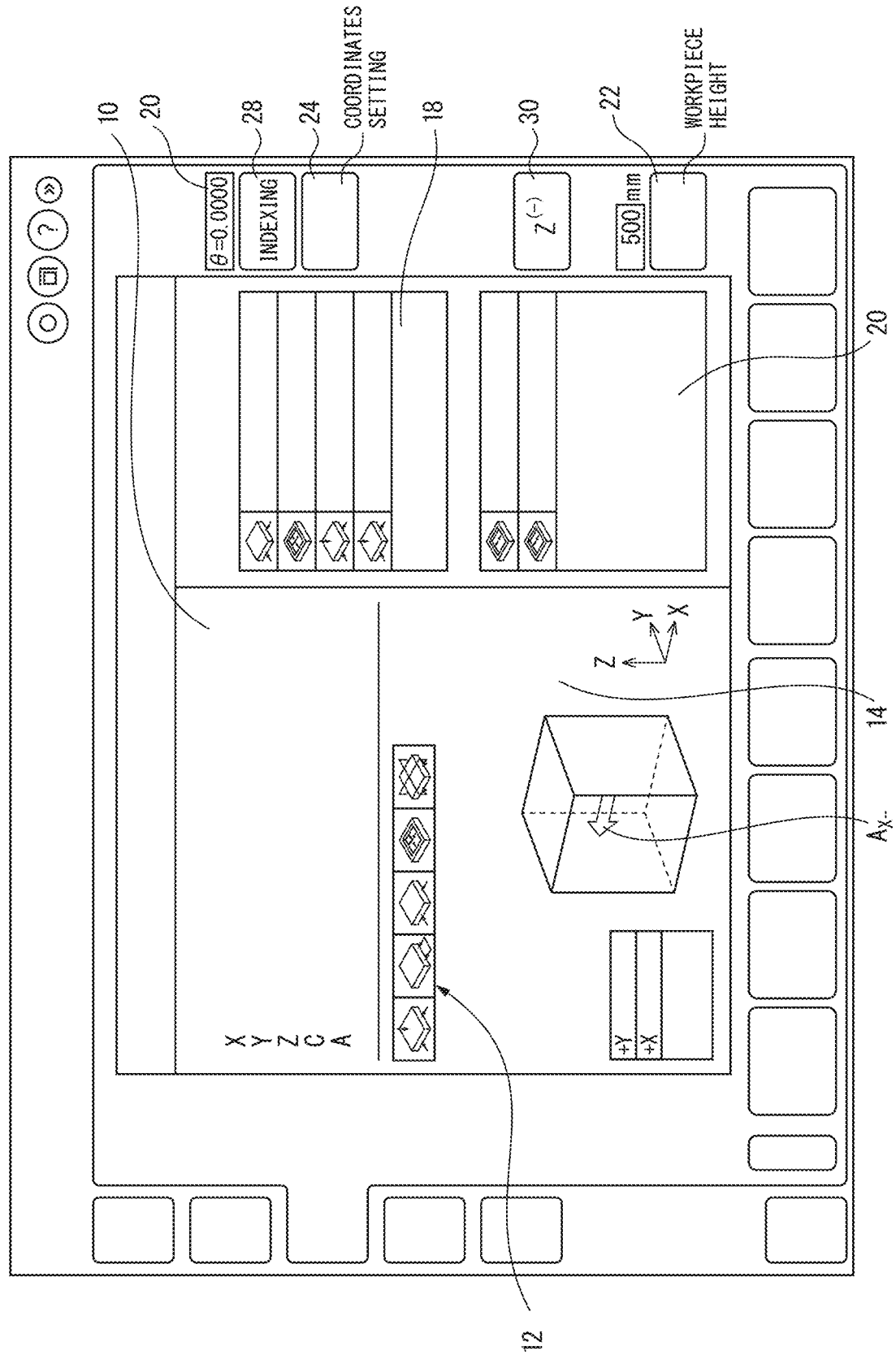
FIG. 4 is a view showing an example of a measurement window for executing the measurement method of the present invention shown on the display part of the control panel of FIG. 2.
Figure 5:
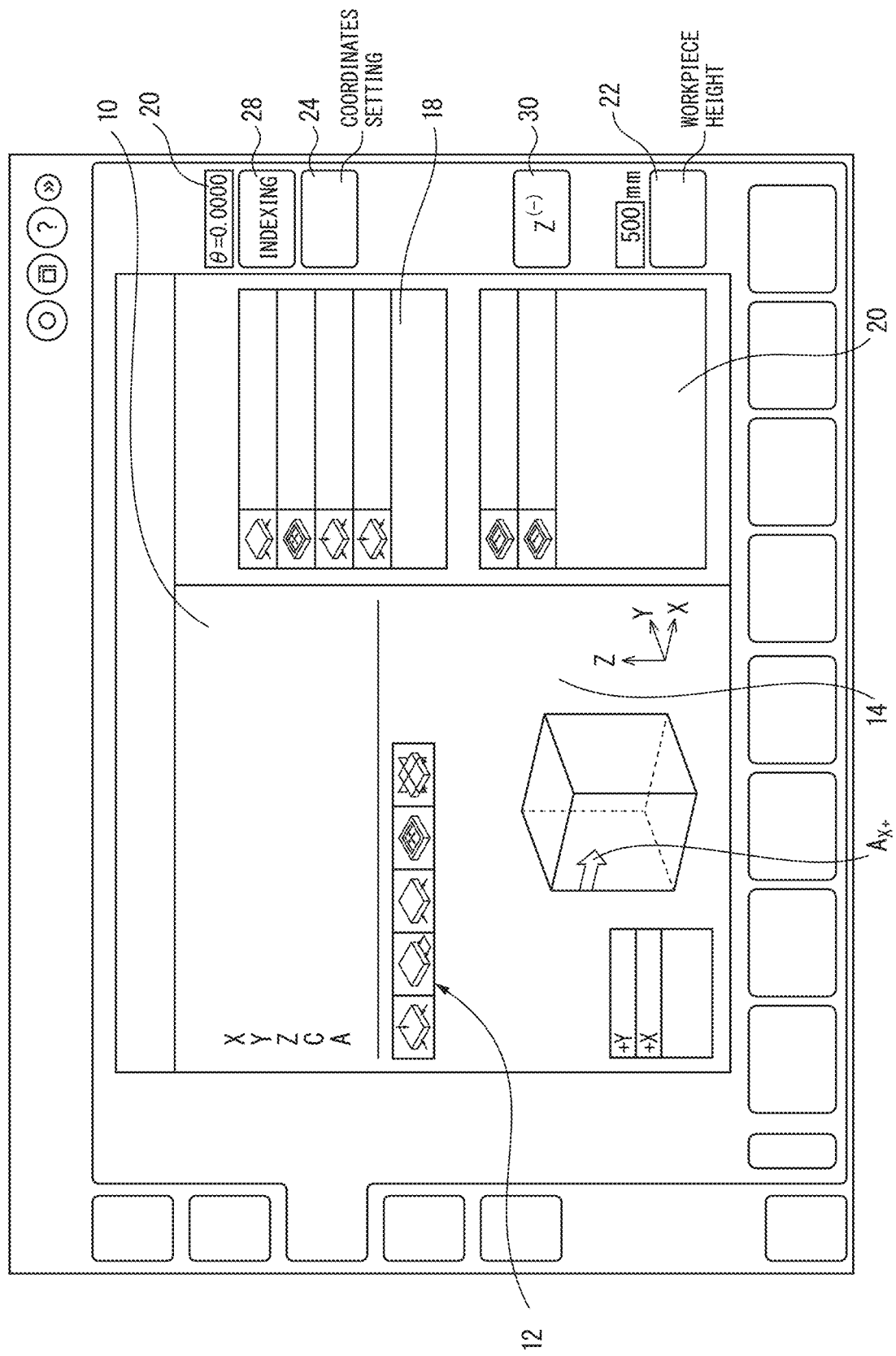
FIG. 5 is a view showing an example of a measurement window for executing the measurement method of the present invention shown on the display part of the control panel of FIG. 2.

FIGS. 4 and 5 show examples of measurement windows for executing the measurement method of the present invention shown on the display part 202. The measurement window includes a feed shaft coordinate display area 10, an icon 12 representing the measurement type, a measurement probe movement direction display area 14 for showing the movement direction (arrow AX−, arrow AX+) of the measurement probe 114 along with the workpiece W, a coordinate display area 16 for displaying coordinate values as measurement results, a dimensions display area 18 for displaying dimension values as measurement results, an inclination angle display area 20 for displaying the inclination angle of the workpiece W relative to the X-axis, and a button 22 for setting danger zones of the measurement probe 114 in the Z-axis directions. Furthermore, a coordinate setting button 24 for setting the measured coordinates in the workpiece coordinate system of the machine tool is provided.

Further, the measurement window includes a Z(−) limit button 30. When an operator taps or clicks the Z(−) limit button 30, the Z coordinate value at that time is read from the Z-axis scale 118, and the coordinate value is set as a Z-axis stroke limit LS in the direction in which the spindle 112 approaches the table 106. When the Z-axis stroke limit LS is set, the spindle 112 cannot approach the table 106 beyond the Z coordinate value, which is the stroke limit LS, until the stroke limit LS has been released.

Furthermore, the color of the Z(−) limit button 30 changes in accordance with state. When the Z(−) limit button is grey, this represents a state in which the stroke limit LS has been released and a new stroke limit Ls can be set. When the $Z^{(-)}$ limit button 30 is blue, this indicates that though a stroke limit Ls has been set, the current Z-axis coordinate value has not reached the set value of the stroke limit L. When the $Z^{(-)}$ limit button 30 is green, this indicates that a stroke limit Ls has been set, and the Z-axis coordinate value has reached the set value of the stroke limit L. When $Z^{(-)}$ limit button 30 is grey and the characters displayed on the button are light grey, this represents a state in which the stroke limit $L_S$ has been released, and the setting of a new stroke limit $L_S$ has been disabled. As a result, an operator can understand the current state at a glance.

Figure 6:
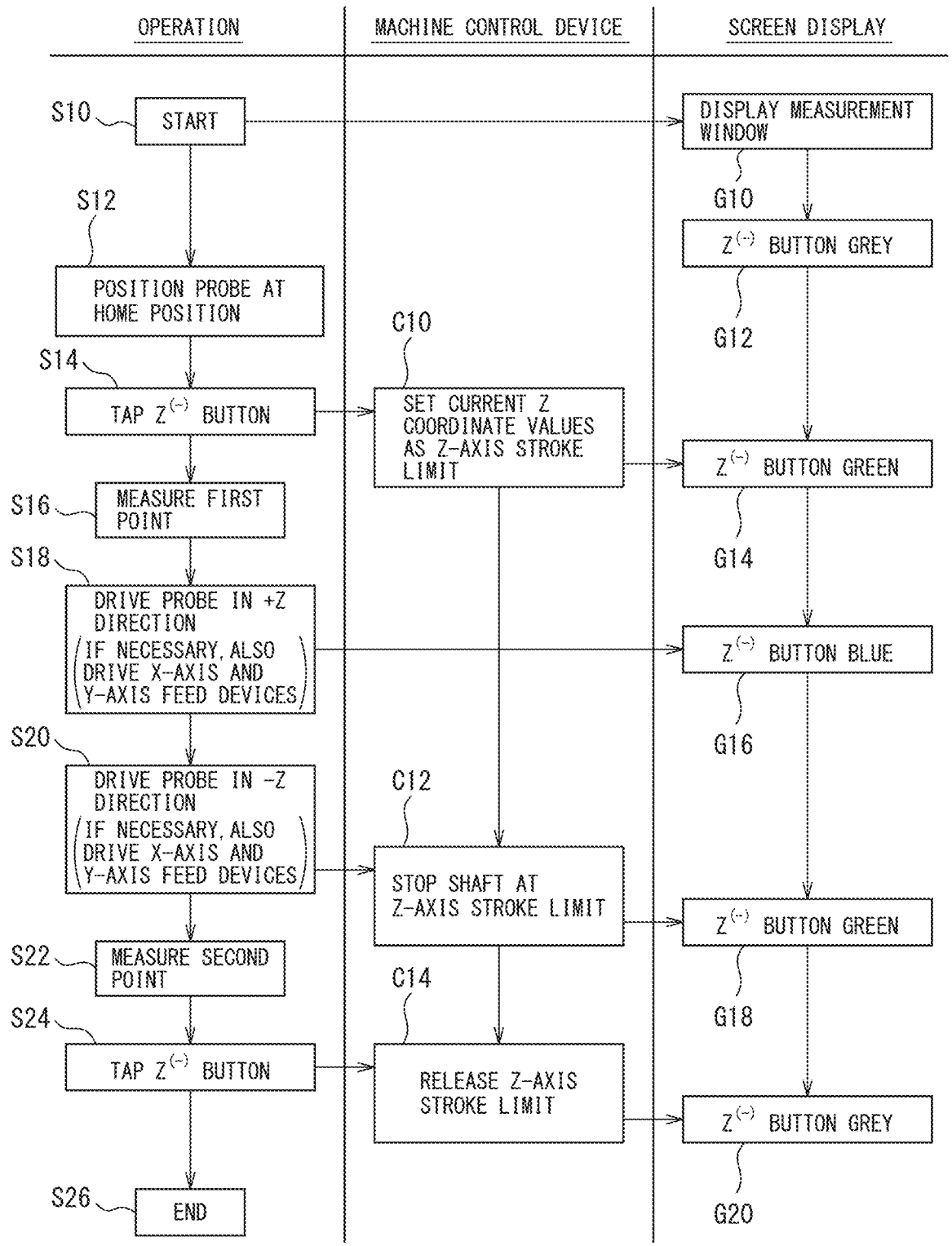
FIG. 6 is a flowchart detailing the method of the present invention.

The method for measuring a workpiece W according to the present embodiment will be described with reference to FIGS. 5 and 6.

When an operator operates the display panel 202 of the operation panel 200 of the machine tool 100 or the key switches of the key input part 204, measurement of the workpiece W starts (step S10) and the measurement window shown in FIG. 5 is displayed on the display panel 202 (step G10). At this time, the Z(−) limit button 30 on the measurement window is shown as grey (step G12).

Next, the spindle 112 is positioned at a measurement start position. This can be executed by, for example, the operator operating the jog buttons 224 of the jog console 220. Alternatively, a measurement start position button (not illustrated) may be provided on the operation panel 200, the jog console 220, or the measurement window, and an NC program may be executed to move the spindle 112 to the measurement start position by pressing, tapping, or clicking the measurement start position button. The measurement start position can be, for example, a position at which the tip of the measurement probe 114 is above the workpiece W and does not contact the workpiece W when the tip of the measurement probe 114 descends along the Z-axis, and at which the tip of the measurement probe 114 can move to the measurement point of the workpiece W through only the X-axis and the Z-axis (refer to FIG. 7).

Figure 7:
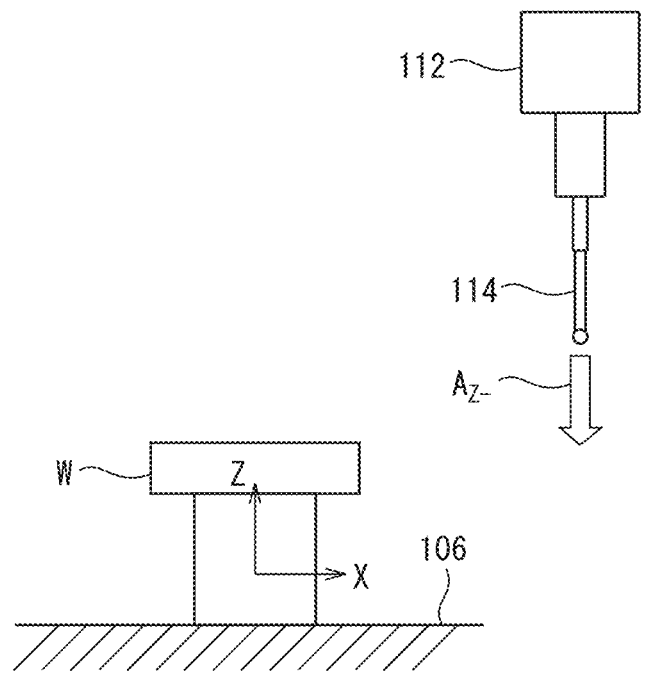
FIG. 7 is a schematic view detailing the method of the present invention showing the relative position of the measurement probe with respect to the workpiece.
Figure 8:
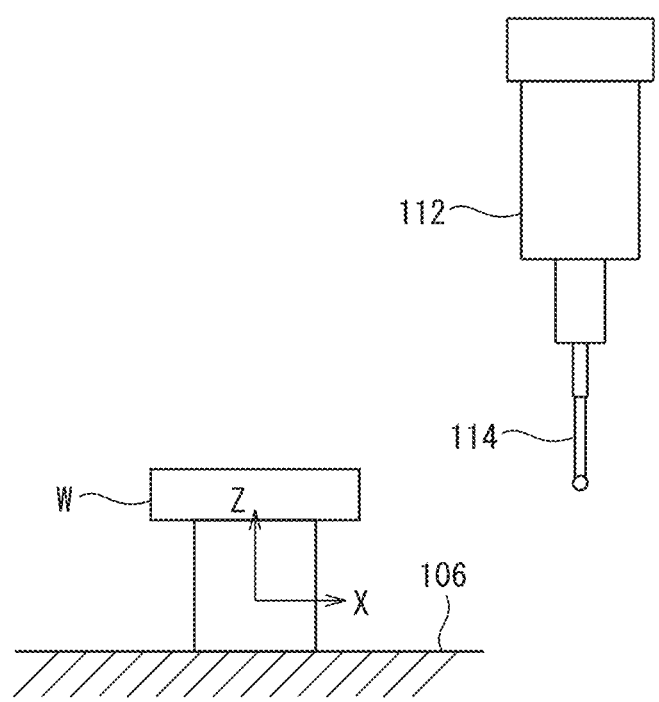
FIG. 8 is a schematic view detailing the method of the present invention showing the relative position of the measurement probe with respect to the workpiece.
Figure 9:
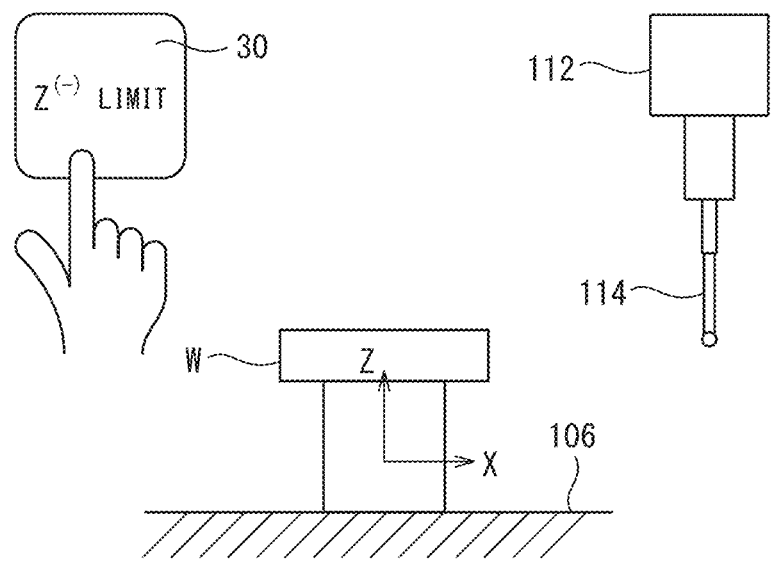
FIG. 9 is a schematic view detailing the method of the present invention showing the relative position of the measurement probe with respect to the workpiece.
Figure 10:
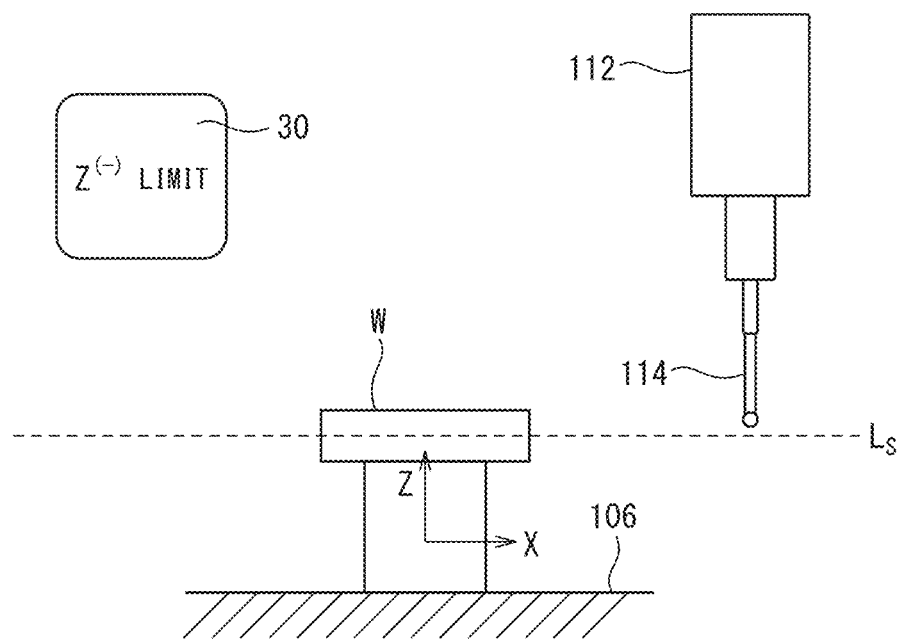
FIG. 10 is a schematic view detailing the method of the present invention showing the relative position of the measurement probe with respect to the workpiece.

Next, the spindle 112 descends in the Z-axis direction by the operation of the jog buttons 224 by the operator as indicated by arrow AZ− in FIG. 7 so that the tip of the measurement probe 114 is arranged at the height of the measurement point of the side surface of the workpiece W (step S12). When the spindle 112 is positioned at the height of the measurement point (refer to FIG. 8), when the operator taps or clicks the Z(−) limit button 30 in the measurement window (refer to FIG. 9), the current Z coordinate value is set as the stroke limit LS (step C10) (refer to FIG. 10), and the color of the Z(−) limit button 30 changes from grey to green (step G14), indicating that the stroke limit LS has been set in the Z-axis.

Figure 11:
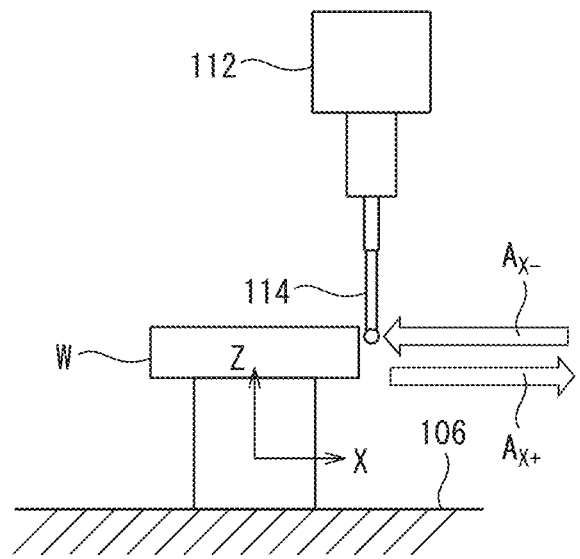
FIG. 11 is a schematic view detailing the method of the present invention showing the relative position of the measurement probe with respect to the workpiece.

Next, the spindle 112 moves in the negative direction along the X-axis, and the X coordinate of the side surface of the workpiece W are measured. Referring to FIG. 11, the operator operates the jog buttons 224 of the jog console 220 (jog-feed operation) and the measurement probe 114 approaches the workpiece W along the X-axis in the direction of arrow AX−. The NC device 150 determines from the X-axis motion command that the measurement probe 114 is moving in a direction in which the X coordinate value is decreasing. As a result, a state in which the measurement probe 114 moves in the negative direction along the X-axis is indicated on the measurement probe movement direction display area 14 by arrow AX−.

When the measurement probe 114 contacts the side surface of the workpiece W, a skip signal is output from the measurement probe 114 to the NC device 150. The NC device 150 stores the coordinates of each of the X-axis, Y-axis, and Z-axis feed shafts at that time in response to the skip signal from the measurement probe 114. When the NC device 150 receives the skip signal, the X-axis feeding is reversed as indicated by arrow AX+ in FIG. 11 so as to separate the measurement probe 114 from the workpiece W. When the measurement probe 114 has moved a predetermined distance and has moved to a position directly under the measurement start position, the reversing operation of the measurement probe 114 ends. As a result, the workpiece W is measured at a first measurement point (step S16).

Figure 12:
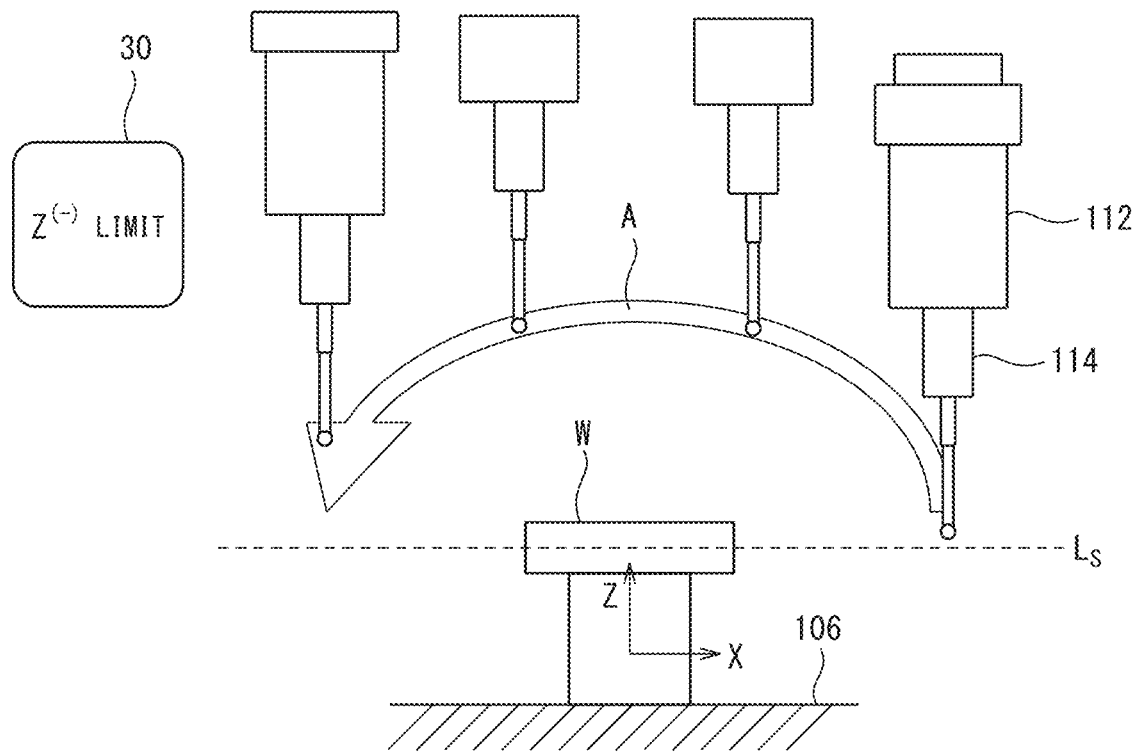
FIG. 12 is a schematic view detailing the method of the present invention showing the relative position of the measurement probe with respect to the workpiece.

Next, in order to measure the opposite side surface, the operator drives the X-axis, Y-axis, and Z-axis feed shafts to move the measurement probe 114 to the opposite side of the workpiece W (step S18). At this time, though the measurement probe 114 can be moved to the opposite side of the workpiece W by moving in the X-Y plane, since the movement path becomes long, in some cases it is preferable to move the measurement probe 114 to the opposite side of the workpiece W while moving upwards and downwards along the Z-axis, as indicated by the arc-shaped arrow A in FIG. 12. In the present embodiment, when the NC device 150 moves the Z-axis feed device in the direction so as to separate from the table 106, in the present embodiment, upwards along the Z-axis or in the positive Z-axis direction, the Z(−) limit button 30, which was green up until this time, changes to blue (step G16), indicating that the Z-axis is above the stroke limit LS.

Figure 13:
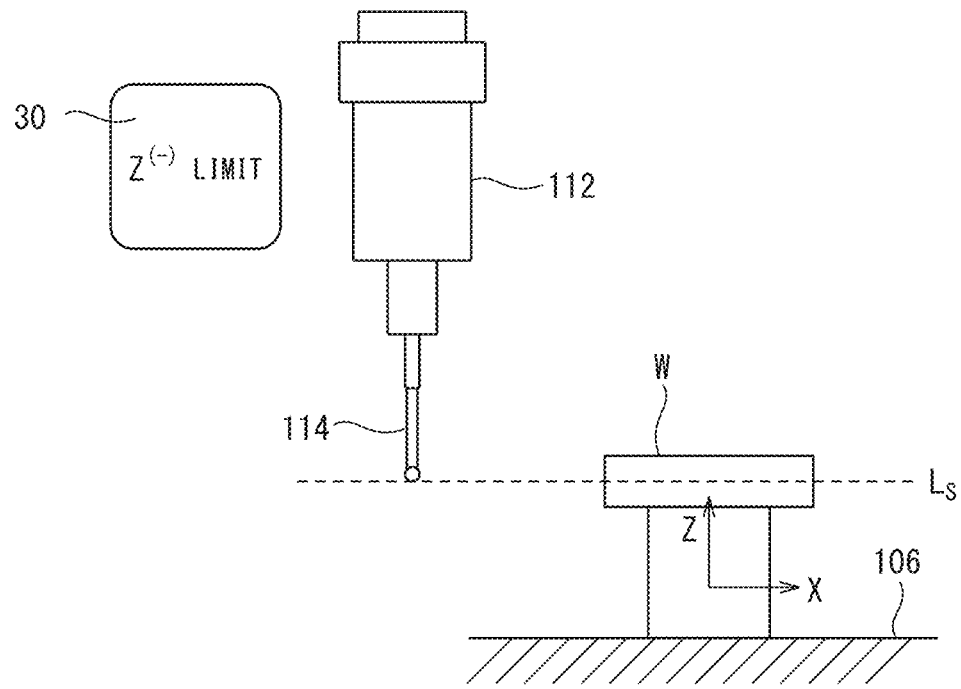
FIG. 13 is a schematic view detailing the method of the present invention showing the relative position of the measurement probe with respect to the workpiece.

Next, while the spindle 112 moves in the negative direction along the X-axis, the Z-axis feed device moves in the direction approaching the table 106, in the present embodiment, downwards along the Z-axis or in the negative Z-axis direction (step S20), and when the Z-axis feed device reaches the Z-axis stroke limit LS, which is the Z coordinate which has been previously measured, as shown in FIG. 13, the NC device 150 stops the Z-axis feed device (step C12). At this time, the Z(−) limit button 30 changes from blue back to green (step G18).

Figure 14:
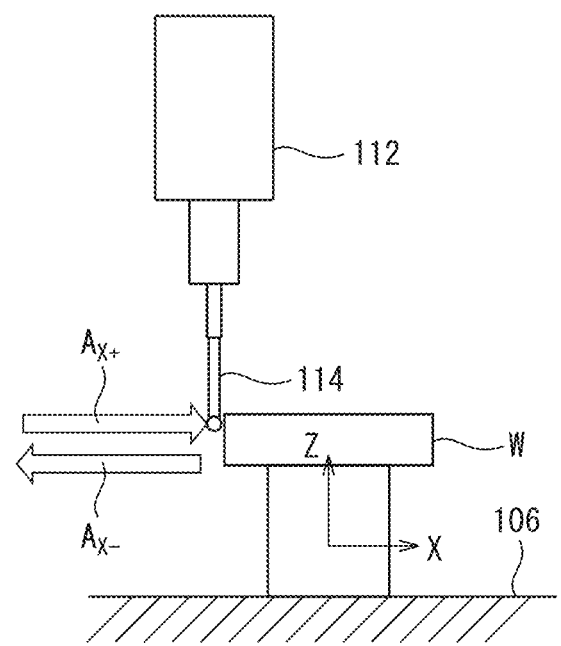
FIG. 14 is a schematic view detailing the method of the present invention showing the relative position of the measurement probe with respect to the workpiece.

Next, the spindle 112 moves in the positive direction along the X-axis to measure the X coordinate of the side surface of the workpiece W. In FIG. 14, the operator operates the jog buttons 224 of the jog console 220 (jog-feed operation) and the measurement probe 114 approaches the workpiece W along the X-axis in the direction of arrow AX+. The NC device 150 determines from the X-axis motion command that the measurement probe 114 is moving in a direction in which the X coordinate value is increasing. As a result, a state in which the measurement probe 114 moves in the positive direction along the X-axis is indicated on the measurement probe movement direction display area 14 by arrow AX+.

When the measurement probe 114 contacts the side surface of the workpiece W, a skip signal is output from the measurement probe 114 to the NC device 150. The NC device 15 stores the coordinates of each of the X-axis, Y-axis, and Z-axis feed shafts at that time in response to the skip signal from the measurement probe 114. When the NC device receives the skip signal, the X-axis feeding is reversed, as indicated by arrow AX− in FIG. 14, to separate the measurement probe 114 from the workpiece W. As a result, the workpiece W is measured at a second measurement point (step S22). Next, when the operator taps or clicks the Z(−) limit button 30, the Z-axis stroke limit LS is released (step C14), and the color of the Z(−) limit button 30 changes from green to grey (step G20).

In the embodiment described above, though all the measurements of the workpiece W are performed by a manual operation in which the operator operates the jog buttons, the feed operation of the measurement probe 114 in the X-axis direction by the jog operation performed by the operator may be stored in the NC device 150 as a measurement teaching operation, and automatic measurement may be performed in accordance with the sored teaching operation, as follows.

When the operator presses an automatic measurement start button 228 of the jog console 220 after the teaching operation, an automatic measurement program stored in the NC device 150 is executed, the measurement probe 114 moves in the negative direction along the X-axis indicated by arrow AX− to the measurement point coordinates (the coordinates of each of the X-axis, Y-axis, and Z-axis feed shafts when the measurement probe 114 contacts the workpiece W) stored in the NC device 150. When the tip of the measurement probe 114 contacts the side surface of the workpiece W, a skip signal is output from the measurement probe 114 to the NC device 150. When the skip signal is received, the coordinates of each of the X-axis, Y-axis, and Z-axis feed shafts are stored in the NC device 150. Furthermore, when the NC device 150 receives the skip signal, the X-axis feeding in the positive direction is reversed as indicated by arrow $A_{X+}$ to separate the measurement probe 114 from the workpiece W, and when the measurement probe 114 has moved a predetermined movement distance, the reversing operation of the measurement probe 114 ends. When automatic measurement has completed, the X coordinates of the side surface of the workpiece W are displayed. When the second measurement point on the opposite side surface of the workpiece W is measured, a process opposite to the aforementioned process is executed.

By performing measurement in this manner in accordance with the measurement program stored in the NC device 150, the speed at which the measurement probe 114 approaches the workpiece W can be optimized and measurement error due to the measurement probe 114 can be reduced.

In the embodiment described above, though the Z-axis feed shaft, which is one of the three orthogonal X-axis, Y-axis, and Z-axis feed shafts as a plurality of feed shafts, is moved to a desired measurement position, the present invention is not limited thereto. The X-axis feed shaft or Y-axis feed shaft may be moved to a desired measurement position.

REFERENCE SIGNS LIST

10 Coordinate Display Area
12 Icon
14 Measurement Probe Movement Direction Display Area
16 Coordinate Display Area
18 Dimensions Display Area
20 Inclination Display Area
24 Coordinates Setting Button
Z(−) Limit Button
100 Machine Tool
110 Spindle Head
114 Measurement Probe
150 NC Device
200 Operation Panel

The invention claimed is:

1. A workpiece measurement method for determining the position of a workpiece on a machine tool based on feed shaft coordinates when a probe and the workpiece contact each other, in which the probe and the workpiece are moved relative to each other by a plurality of feed shafts, the method comprising the steps of:
   moving one of the plurality of feed shafts to a desired measurement position;
   storing coordinate values of the one feed shaft at the desired measurement position;
   moving the probe and the workpiece relative to each other by means of the one feed shaft and another feed shaft;
   stopping the movement by the one feed shaft when the stored coordinate values have been reached; and
   measuring the workpiece at a plurality of measurement points by moving the probe using the other feed shaft in a state in which the one feed shaft is stopped at the coordinate values.

2. The workpiece measurement method according to claim 1, wherein the machine tool comprises a spindle supported so as to rotate about a predetermined axis, a table which is arranged so as to face the spindle and which has a workpiece attachment surface on which the workpiece is attached, and feed shafts for moving the spindle and the table relative to each other in orthogonal three-axis directions consisting of X-axis, Y-axis, and Z-axis directions, and
   the probe is mounted on the tip of the spindle and the one feed shaft is a Z_axis shaft, which is parallel to the axis of the spindle.

3. The workpiece measurement method according to claim 2, wherein an NC device for controlling the orthogonal three-axis feed shafts and the spindle enables an operator to manually operate the orthogonal three-axis shafts.

4. The workpiece measurement method according to claim 3, wherein in the case in which the operator manually operates the Z-axis feed device in a direction in which the probe approaches the table, when the Z-axis feed device has reached the stored coordinate values, the NC device prevents the Z-axis feed device from moving beyond the coordinate values approaching the table.

\* \* \* \* \*